June 6, 1939. E. A. MURPHY ET AL 2,161,080
TUBULAR RUBBER AND SPRING STRUCTURE AND METHOD OF PRODUCING THE SAME
Filed April 2, 1937   3 Sheets-Sheet 1
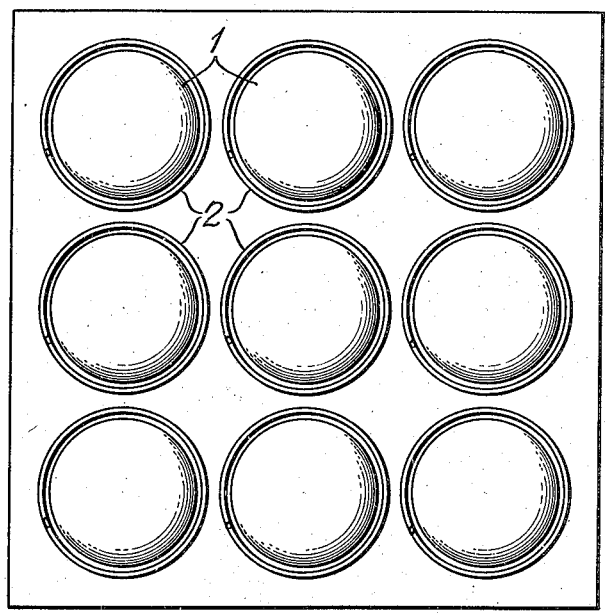
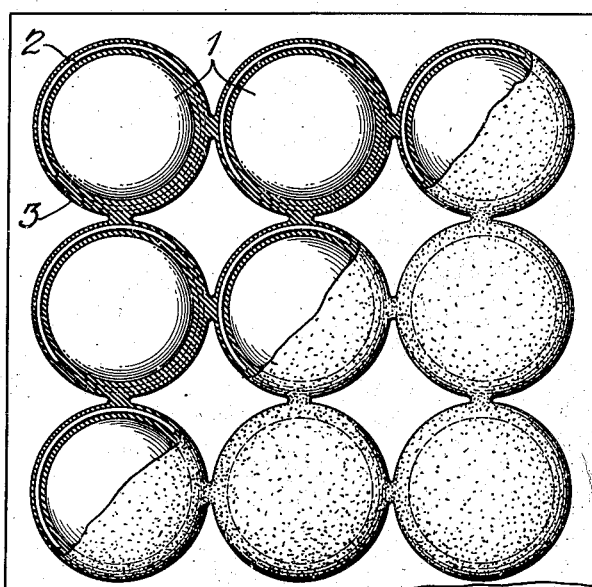
INVENTORS
EDWARD A. MURPHY.
BY GEOFFREY W. TROBRIDGE.
ALBERT N. WARD.
ATTORNEYS June 6, 1939.  E. A. MURPHY ET AL  2,161,080
TUBULAR RUBBER AND SPRING STRUCTURE AND METHOD OF PRODUCING THE SAME
Filed April 2, 1937  3 Sheets-Sheet 2

INVENTORS
EDWARD A. MURPHY.
BY GEOFFREY W. TROBRIDGE.
ALBERT N. WARD.

ATTORNEYS

June 6, 1939. E. A. MURPHY ET AL 2,161,080
TUBULAR RUBBER AND SPRING STRUCTURE AND METHOD OF PRODUCING THE SAME
Filed April 2, 1937 3 Sheets-Sheet 3
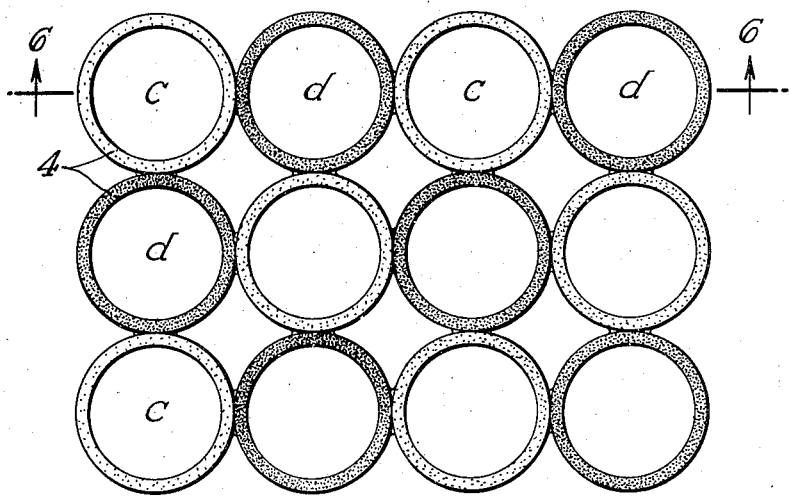
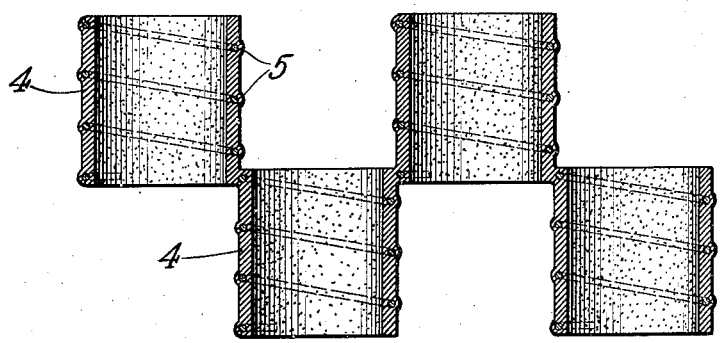
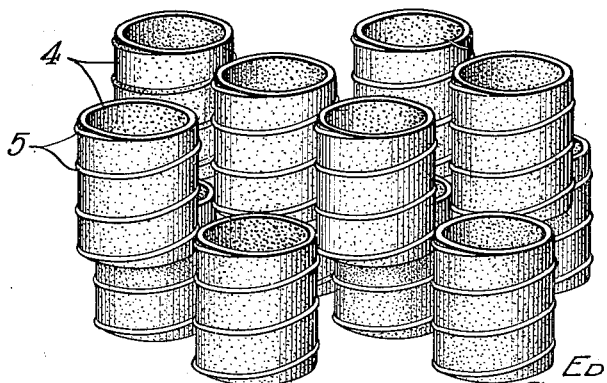
INVENTORS
EDWARD A. MURPHY.
GEOFFREY W. TROBRIDGE.
ALBERT N. WARD.
BY
ATTORNEYS Patented June 6, 1939

2,161,080

UNITED STATES PATENT OFFICE 2,161,080

TUBULAR RUBBER AND SPRING STRUCTURE AND METHOD OF PRODUCING THE SAME

Edward Arthur Murphy, Wylde Green, Birmingham, Geoffrey William Trobridge, Sutton Coldfield, and Albert Nelson Ward, Alum Rock, Birmingham, England, assignors to Dunlop Rubber Company Limited, London, England, a British company Application April 2, 1937, Serial No. 134,674
In Great Britain May 27, 1936

12 Claims. (Cl. 18—58)

Our invention relates to a composite structure of rubber and a helical spring embedded therein.

The composite structure of our invention may comprise a single tubular wall having embedded therein a helical spring-like structure, so as to form a non-kinking tube or pipe, or may be formed in a composite block-like structure of rubber and springs comprising a number of tubes in substantially parallel alignment and cohesively united, the wall of each tube being provided with a helical spring embedded or partially embedded in the rubber. In the latter structure, the upper and lower ends of the springs are preferably arranged, so as to lie in surfaces of predetermined contour. The tubes in each case may be made directly from an aqueous dispersion of rubber.

Structures of the above type have a load carrying capacity greater than that corresponding to the summation of the load carrying capacities of the spring and rubber tube when each is determined separately, accordingly such a helical spring- rubber tubular construction has a high load deflection ratio and accordingly permits of the production of upholstery units of high load carrying capacity relative to weight or density. This is particularly the case, if the rubber tubular walls are formed of a cellular structure, such as that of foamed latex rubber. When single tubes are used for such purposes as gas mask connections and pressure and vacuum tubes for aircraft control, the walls will, of course, be substantially impermeable, a very light tube being thus formed.

According to the present invention, the process for making composite rubber structures comprises dipping a helical spring into an aqueous dispersion of rubber, retaining on removal of the spring from the aqueous dispersion aforesaid the films of dispersion formed between the successive convolutions of the helical spring and coagulating the aqueous dispersion of rubber on the helical spring.

If desired, a number of helical springs can be dipped into an aqueous dispersion of rubber, the helical springs having their upper and lower ends so arranged as to lie in surfaces of predetermined contour and being so arranged that any film between successive convolutions of a helical spring will be joined to the film between successive convolutions of an adjoining helical spring.

Alternatively, one helical spring can be mounted on a former or a number of helical springs can be mounted over formers, the whole assembly sprayed or otherwise coated with an aqueous dispersion of rubber, the thus applied aqueous dispersion of rubber coagulated and the formers removed from the composite structure thus produced. The formers are preferably mounted on a baseboard.

Mounting the springs over formers leads in most cases to the production of more uniform results.

Particularly useful upholstery units are produced by using frothed aqueous dispersions of rubber.

The function of the helical springs being mechanical, they may be made from any suitable material to suit the purpose for which the structure is to be used. For example, they may be made from wire made of steel or other suitable metal or metal alloy, or from a resilient plastic material such as a single, coarse rayon filament.

For upholstery purposes, the composite structures according to the invention can be used in several ways. For example, a number of rubber tubes made directly from an aqueous dispersion of rubber and provided with a helical spring embedded or partially embedded in the rubber may be packed together under a cover with their axes parallel and normal to a baseboard or they may be assembled before covering by means of a suitable adhesive into a similar block.

Alternatively, a composite block-like structure of the same thickness can be produced by using tubes of half the length arranged in two layers, wherein a tube in one layer is held in place by adhesion at one end by one or more tubes in the other layer. A convenient arrangement is such that in the main a tube in one layer is bonded at one end to the ends of four tubes in the other layer.

The tubes forming the four side walls of the composite block-like structure are for the most part so arranged that any one tube in one layer is joined to two tubes in the other layer. Such a block could be produced, for example, by providing two baseboards with suitably located pegs, mounting helical springs on these pegs, dipping each set of mounted springs into a latex mixing, coagulating the latex deposited on the springs, applying adhesive to the free ends of the two sets of rubber tubes and then uniting the two layers of rubber tubes in such a way that for the most part, that is to say, excepting the tubes forming the side walls, any one tube in one layer is attached to four tubes in the other layer.

A composite block-like structure can also be produced according to the invention by mounting a number of helical springs, which may or may not be rubber covered, on parallel cylindrical formers mounted on a baseboard and so spaced that on dipping the whole into a latex mixing, preferably previously frothed, each spring becomes embedded in a cylindrical rubber structure and these cylindrical structures become interconnected by films or webs of rubber, which maintain the whole as a single block-like structure after drying, vulcanization and separation from the formers.

Again it is apparent that the overall density of any such block-like structure can be reduced either by increasing the distance between the adjacent springs, or by increasing the diameter of the springs themselves. Waisted or tapered springs can also be used where a high degree of compressibility is desired in the structure.

The rubber tubes made in accordance with the invention in view of their strength in relation to their weight can also find suitable application as light and "unkinkable" tubes for gas mask connections and pressure and vacuum tubes for aircraft controls.

The dispersions comprise natural or artificial aqueous dispersions of rubber or similar vegetable resins, such as gutta-percha, balata with or without the addition of aqueous dispersions of rubber-like substances, such as the so-called synthetic rubbers, mineral rubber, or rubber substitutes such as factice or rubber reclaim, or rubber waste or oils, for example, rape oil or vulcanized oils or cellulose esters, or proteins, for example, casein.

The main dispersions may be concentrated and/or prevulcanized and/or compounded or compounded and subsequently concentrated.

The compounding ingredients may be chosen from vulcanizing agents, such as sulphur, and organic accelerators, fillers and reinforcing agents, such as whiting, clay, barium sulphate, lithopone, lamp black, gas black, zinc oxide, or powdered ebonite or vulcanite, colouring matters, preservatives or softeners.

Compounded concentrates, such as are described in Patent 1,846,164 are particularly suitable for use.

Aqueous dispersions of synthetic rubber with or without any one or more of the hereinbefore mentioned compounding ingredients may also be used.

The reversible frothed aqueous emulsions or dispersions described in Patent No. 1,852,447 and in British Patent No. 332,526 can also be used.

The various features of the invention are illustrated by way of example in the accompanying drawings, in which—

Fig. 1 is a plan view of an assembly of nine cylindrical former elements each encircled by a spring in position for the formation of a composite article of the present invention.

Fig. 2 is a plan view of the assembly of Fig. 1 after having been given a deposit of foamed latex, part of the deposit being shown in section to illustrate its formation.

Fig. 5 is a plan view of a tubular structure comprising two layers of rubber embedded springs.

Fig. 6 is a section on the line 6—6 of Fig. 5, and

Fig. 7 is a perspective view of the structure of Fig. 5.

Figure 3:
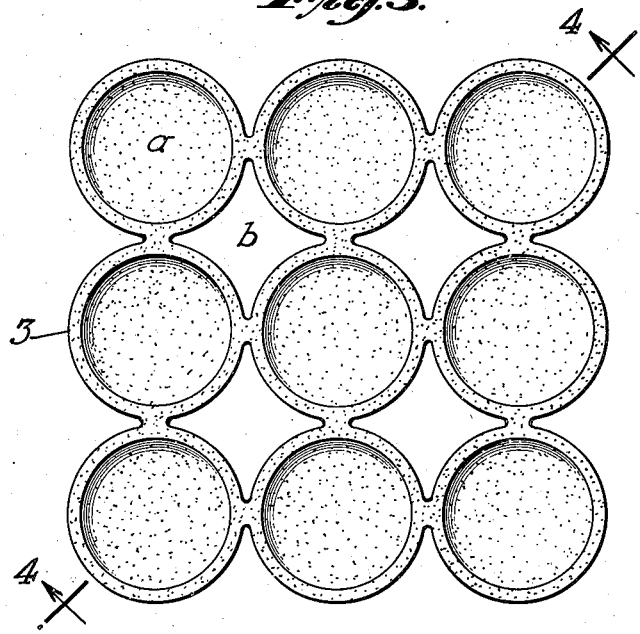
Fig. 3 is an inverted plan view of the composite spring and foamed rubber structure after removal from the former elements.

In the embodiment of the invention shown in Fig. 1, a number of formers 1 are mounted in spaced assembly with their axes parallel. Each of the former elements 1 is encircled by a helical spring 2 of a heighth equalling that of the former and of slightly greater diameter so as to be uniformly spaced from the surface of the former and from the adjacent springs. For example, the formers may be of one inch outer diameter and spaced one and one-half inches apart, and the helical springs 2 may be of 24 gauge steel wire three inches in length, of one inch pitch and one and one-quarter inch external diameter. The springs and former elements are mounted on a suitable base. The assembly is then dipped into a compounded latex or aqueous rubber dispersion of any suitable type, for example, a foamed compounded latex of 57% total solids and beaten to a froth of a density of about 0.25. Upon slowly withdrawing the formers, a film 3 of foamed latex mixing surrounds each element and, owing to the proximity of the elements and web or rib of the foamed latex mixing, connects the nearest parts of the adjoining former elements. The deposits 3 are set by subsequently dipping into a 10% solution of acetic acid, or by otherwise setting and coagulating, after which the deposits are cured, dried and stripped by any convenient or usual procedure. The final product, which may be used as an upholstery filling, is a structure comprising a series of hollow cylinders of cellular rubber reinforced with steel springs and inter-connected by webs of cellular rubber.

Figure 4:
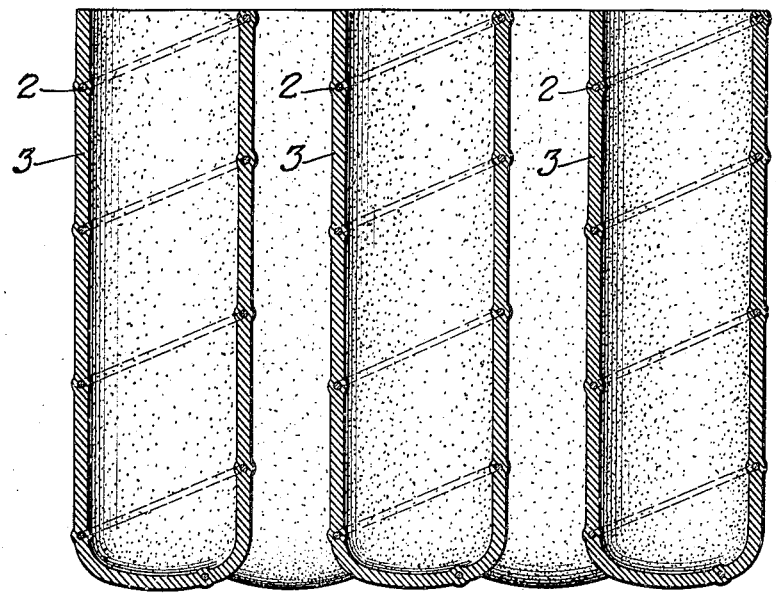
Fig. 4 is a section on line 4—4 of Fig. 3.

Cavities $a$ are formed by the film surrounding the formers, and cavities $b$ are formed by the web connections between the films on the former elements. The cavities $a$ are closed at the bottom due to a film of rubber covering the base of each former element, while the cavities $b$ are open from top to bottom as shown diagrammatically in Fig. 4. The finished product, therefore, has at one end an open, honeycomb structure and, at the other end, thin bottoms of rubber covering the cavities $a$.

In the embodiment of the invention illustrated in Figs. 5, 6 and 7, a composite block is made of twelve hollow cylinders of rubber 4 reinforced with steel springs 5. These cylinders are divided into six top tubes $c$ and six bottom tubes $d$. It will be apparent from Fig. 5 that the innermost top tube $c$ is joined to four bottom tubes $d$, and the innermost bottom tube $d$ is joined to four top tubes $c$. The tubes on the sides are each joined to three other tubes, and those on the corner to two tubes. This structure may be formed by forming the tubes separately and cementing them, in the construction shown, or by dipping or spraying a suitable spring arrangement with the aqueous dispersion of rubber.

Having now particularly described our invention, we claim:

1. A process for making composite rubber structures which comprises dipping a helical spring into an aqueous dispersion of rubber, withdrawing the spring from the aqueous dispersion aforesaid in a direction to form a wall of dispersion embedding and extending between the successive convolutions of the helical spring and coagulating the aqueous dispersion of rubber on the helical spring.

2. A process for making composite rubber structures which comprises dipping a number of helical springs into an aqueous dispersion of rubber while the upper and lower ends of the spring lie in surfaces of predetermined contour and withdrawing said springs from the aqueous dispersion to form walls of dispersion embedding and extending between the convolutions of said helical springs and with the wall of one spring joined to the wall of an adjacent spring between successive convolutions of said spring.

3. The process of forming a composite rubber structure, which comprises spraying an aqueous dispersion of rubber composition onto a helical spring-like structure to form a tubular structure embodying said helical structure and extending between the turns of said helical spring-like structure and coagulating the rubber in the resulting tubular structure.

4. The process of claim 1, in which the aqueous dispersion of rubber is in the form of a foam.

5. An upholstery structure comprising a number of hollow integrally joined shells of cellular rubber the walls of said shells being reinforced with individual helical springs embedded therein.

6. An upholstery structure comprising a number of hollow integrally joined shells of cellular rubber the walls of said shells being reinforced with individual helical springs embedded therein, the upper end of each shell being closed integrally with cellular rubber.

7. The structure of claim 5 in which the walls of said shells are tangentially joined.

8. The structure of claim 5 in which said helical springs are of resilient plastic material.

9. The structure of claim 5 in which alternate shells are offset longitudinally in opposite directions from an overlapping zone and in which said shells are joined integrally at said overlapping zone.

10. The structure of claim 5 in which said cellular rubber is foamed latex rubber.

11. An integral mass of resilient cellular rubber having a number of spaced recesses and a number of helical springs each embedded in said mass about a respective recess.

12. The structure of claim 5 in which the inner surface of said shells is a molded surface.

EDWARD ARTHUR MURPHY.
GEOFFREY WILLIAM TROBRIDGE.
ALBERT NELSON WARD.